March 19, 1935.  J. PORZEL  1,994,784
HOSE COUPLING
Filed May 12, 1934
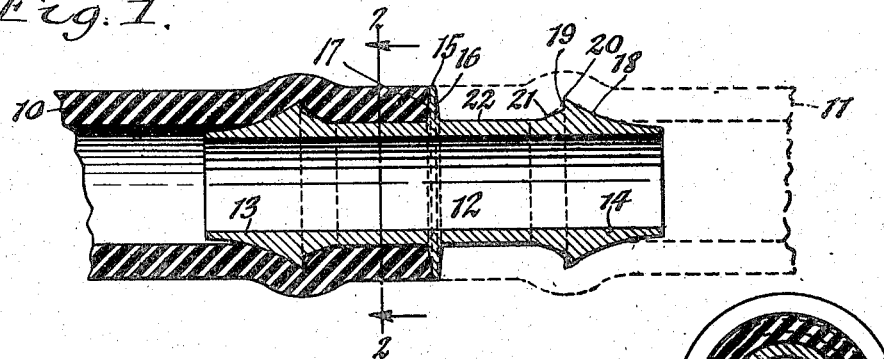
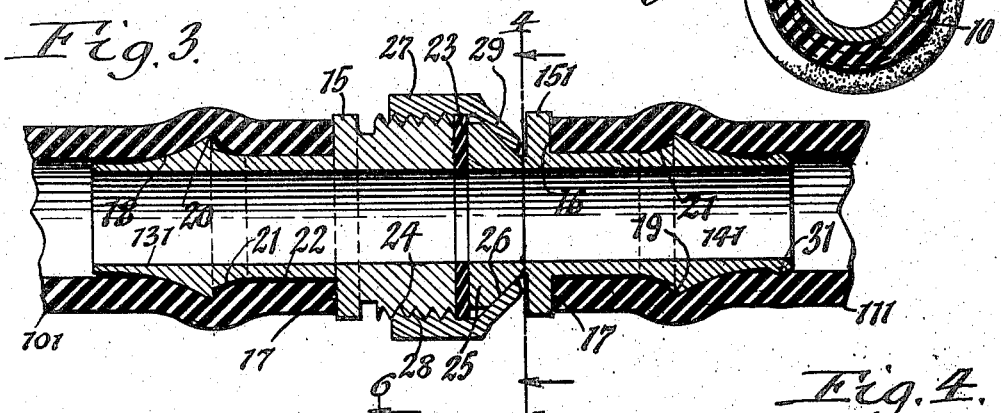
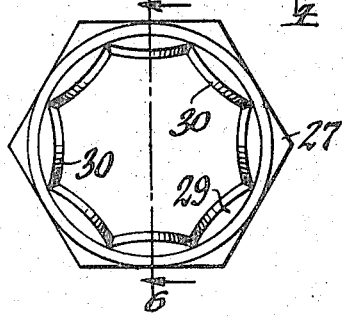
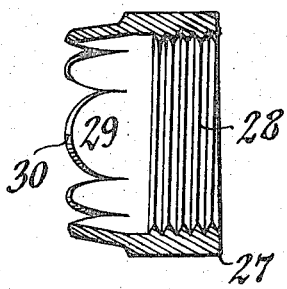
INVENTOR
Joseph Porzel
BY
Popp & Popp
ATTORNEYS Patented Mar. 19, 1935

1,994,784

UNITED STATES PATENT OFFICE 1,994,784

HOSE COUPLING

Joseph Porzel, Grand Island, N. Y., assignor to Winslow P. Bradford, Grand Island, N. Y.

Application May 12, 1934, Serial No. 725,332

1 Claim. (Cl. 285—76)

This invention relates to a coupling for connecting the opposing ends of two sections of water conducting hose or the like for the purpose of making repairs and for detachably connecting the same.

One object of this invention is to provide a hose coupling which is simple in construction and permits of reliably connecting the opposing ends of two sections of hose in making repairs without the use of any external clamps or similar fastening means.

Another object of this invention is the provision of a coupling for detachably connecting the ends of two sections of hose which is simple and durable in construction and reliable in operation and which consists of a minimum number of parts which can be manufactured and assembled at low cost.

In the accompanying drawing:

Figure 1 is a longitudinal section of a hose coupling embodying one form of my invention which is more particularly designed for repairing hose by connecting two sections formed by severing a hose where the same contained a leak.

Figure 2 is a cross section taken on line 2—2 Fig. 1.

Figure 3 is a longitudinal section showing several features of my improvements embodied in a hose coupling which is more particularly designed for detachably connecting two sections of a hose.

Fig. 4 is a cross section taken on line 4—4 of Fig. 3.

Fig. 5 is an end view of a coupling thimble.

Fig. 6 is a cross section taken on line 6—6 of Fig. 5.

In the following description similar characters of reference indicate like parts in the several figures of the drawing.

Referring to the construction shown in Figs. 1 and 2, the numerals 10, 11 represent two sections of a piece of hose which has been cut at a leak therein to permit of repairing the same at this place by a coupling constructed in accordance with one feature of my invention.

The form of coupling shown in these figures comprises an integral tubular body, the bore 12 of which is of uniform diameter and the opposite ends of which form two nipples 13, 14 adapted to be inserted into the opposing ends of the hose sections for effecting a connection between the same so that the interior of the sections are in communication. On its central part of this tubular body the same is provided on its exterior with an annular collar 15, the opposite sides of which form annular forwardly facing shoulders or stops 16 adapted to be engaged by the ends 17 of the sections of the hose which is to be repaired.

On the front part of the periphery of each nipple of the tubular body the same is provided with a forwardly tapering spreading face or cone 18 which is preferably of concave form in longitudinal section and terminates with its small end at the outer or front end of the respective nipple while the large rear or inner end of this tapering surface preferably terminates short of the central part of this nipple.

Immediately in rear of the large rear end of each tapering face 18 the respective nipple is provided with an abrupt rearwardly facing shoulder 19 which is preferably arranged at right angles to the axis of the nipple and extends radially inward from the large tapering spreading face so as to form a comparative sharp gripping edge 20 at the corner between the shoulder 19 and the large end of the tapering spreading face.

Between the rearwardly facing shoulder 19 and the forwardly facing shoulder 16 of each nipple the latter is reduced to form a contracted neck, the peripheral front part 21 of which is tapered rearwardly from the shoulder 19 to form a detent cone, while the rear peripheral part 22 of this neck is preferably cylindrical in form and extends from the small end of the conical part 21 to the forwardly facing shoulder 16.

The diameter of the small front end of the tapering spreading face is preferably, though not necessarily, slightly larger than the diameter of the bore of the hose adapted to receive the respective nipple. The diameter of the large end of the spreading cone is greater than that of the bore of the hose adapted to be coupled, but less than the maximum stretching capacity of the rubber or other elastic material forming part of the hose. The diameter of the large front end of the rear cone face 21 is less than the diameter of the large rear end of the spreading cone so as to form the abrupt shoulder 19 and the sharp edge 20, and the diameter of the cylindrical rear part 22 of the neck is preferably equal to the diameter of the small end of the detent cone and preferably slightly larger than the diameter of the small front end of the spreading cone, as shown in Fig. 1.

When using this coupling for repairing a hose which has been cut at the point of leakage into two sections preparatory to mending the same, each nipple of this coupling is pushed into the end of one hose section until the rear stop or shoulder 16 of the respective nipple engages with the end of the hose section. During this operation the small front end of the spreading cone can be readily inserted for some distance into the end of the hose until the inner corner engages the concave tapering face 14. Thereafter further forward movement of the coupling relative to the hose causes the front end of the latter to be spread until large rear end of the spreading cone has been reached, after which the further spreading of the hose ceases. Upon continuing the further forward movement of the coupling after the hose has reached the large diameter of the spreading cone the advancing end of the hose commences to contract due to its resilience so as to engage with the marginal part of the rearwardly facing shoulder 19, then the bore of the hose contracts and engages the periphery of the detent cone 21, which contraction continues until the hose engages the cylindrical rear part 22 of the neck and no further contraction occurs up to the time the end engages the forwardly facing stop shoulder 16.

As the bore of the hose turns inwardly around the sharp corner at the large rear end of the spreading cone and engages with the abrupt shoulder 19 a sharp bend is produced in the hose which operates to produce a firm grip between the hose and the coupling without however cutting the hose and thereby prevents the same from being pulled apart when subjected to ordinary strains such as would occur during normal use of the hose. This grip is further increased by engagement of the bore of the hose with the detent cone 21 of the respective nipple and the contraction of the hose around the cylindrical part of the neck due to the fact that the hose has not been stretched by the spreading cone beyond its elastic limit and therefore has retained its contractile capacity for effectively gripping effect between the hose and the nipple.

By utilizing the detent cone 21 of small size in rear of the spreading cone which is of large size at the opposing ends of the same, the hose is prevented from contracting its maximum extent immediately after passing the comparatively sharp edge 20 of the large cone which otherwise might interfere with slipping of the hose over the reduced neck of the nipple, and instead of this the hose is compelled to contract gradually by first engaging with the detent cone 21 and then with the cylindrical surface of the neck and permit of readily coupling the hose sections but preventing the same from being pulled apart under ordinary conditions.

It will be noted that in this construction only one sharp shoulder is provided on the hose coupling, having a diameter which will not expand the hose beyond its elastic limit and its contraction is also arrested by the neck before the full contracting capacity of the hose has been reached, thus permitting the hose to exert a tight grip upon the periphery of the neck and firmly engage the rear shoulder 16 for preventing the hose from splitting at the end.

By thus employing a single rearwardly facing shoulder on each nipple the entire contracting force of the hose is concentrated on the same, thereby producing a more leak-proof and stronger joint than is possible if the contracting force of the hose were spread over a plurality of such shoulders.

When utilizing this invention in a coupling for detachably connecting two sections 101, 111 of a hose the body of the coupling is made in the form of two separate nipples 131, 141, as shown in Figs. 3 and 4, and the opposing ends of the two hose sections may be secured to the respective hose sections by substantially the same means shown in Figs. 1 and 2, and the foregoing description therefore also applies to the detachable hose coupling.

Various means may be employed for detachably connecting the nipples 131, 141 but the means shown for this purpose in Figs. 3-6 are constructed as follows:—

The numeral 23 represents a packing washer interposed between the ends of the separable nipples 131, 141 for producing a leak-tight joint between these nipples when the same are drawn together. On the rear part of the periphery of the nipple 131 the same is provided with an external screw thread 24 and the rear part of the periphery of the other nipple 141 is provided with an annular collar 25 having a conical front face or shoulder 26.

Surrounding the opposing ends of the separable nipples is a coupling sleeve 27 which is provided on one end with an internal screw thread 28 which engages the external thread 24. On the opposite end of the coupling sleeve the same is provided with a plurality of coupling lips or lugs 29 which are arranged in an annular row and converge inwardly so that they overlap the conical face or shoulder 26 of the collar 25 and together form a cone.

In the manufacture of this coupling the several coupling lips of the coupling sleeve are first left in a spread apart position, as shown in Figs. 5 and 6, so as to permit these lips to be passed over the collar 25. After this a continued movement of the collar 25 and the nipple 141 toward each other in a machine or apparatus adapted for this purpose will cause the lips 29 to engage the stop collar 151 of the respective nipple and bend these lips inwardly into a position in which the same overlap the collar 25, as shown in Fig. 3, thereby connecting the nipple 141 and sleeve but permitting the same to be turned one relatively to the other for connecting and disconnecting the nipples 131, 141 through the medium of the screw joint between the coupling sleeve and the nipple 131.

In order to permit the free ends of the coupling lips to be bent inwardly toward each other without interference, clearance is provided on these lips and this preferably is effected by rounding the ends of the lips convexly, as shown at 30 in Figs. 4, 5 and 6.

It has been found that if any play or free movement is permitted between the small outer end of the spreading cone of a coupling nipple that such play is liable to produce a kink in the adjacent part of the hose and cause the same to break and leak. To avoid this an annular bead is provided on the periphery of the small end of the spreading cone, as shown at 31 at the right of Fig. 3, which bead fits closely into the bore of the adjacent part of the hose and prevents any play therebetween which might have an objectionable effect.

I claim as my invention:

A coupling for connection with the end of an elastic hose, including a tubular body having its periphery provided with a forwardly tapering entering surface at the front end of the body, an abrupt shoulder extending inwardly from the large rear end of said tapering surface forming a relatively sharp edge at the junction of said tapering face and shoulder, a rearwardly tapering stop surface arranged in rear of said shoulder and having its large front end of smaller diameter than the rear end of said tapering entering surface, and a cylindrical gripping surface extending rearwardly from the small end of said stop surface, whereby upon inserting said body with its front end foremost into a hose the latter will be first spread by said forwardly tapering face, then the hose will pass over said sharp edge and the latter will embed itself into the bore of the hose, then the hose will contract in rear of said sharp edge until its bore engages said stop surface and thereby limit the contraction of the hose to such an extent as would permit said sharp edge to cut and injure the bore of the hose, and then the hose contracts so that its bore grasps the gripping surface of said body and forms an extended joint between the hose and body which strengthens this connection and prevents loosening of the same.

JOSEPH PORZEL.